April 15, 1941.  A. RONNING  2,238,707
LAWN MOWER
Filed July 27, 1938  2 Sheets-Sheet 1
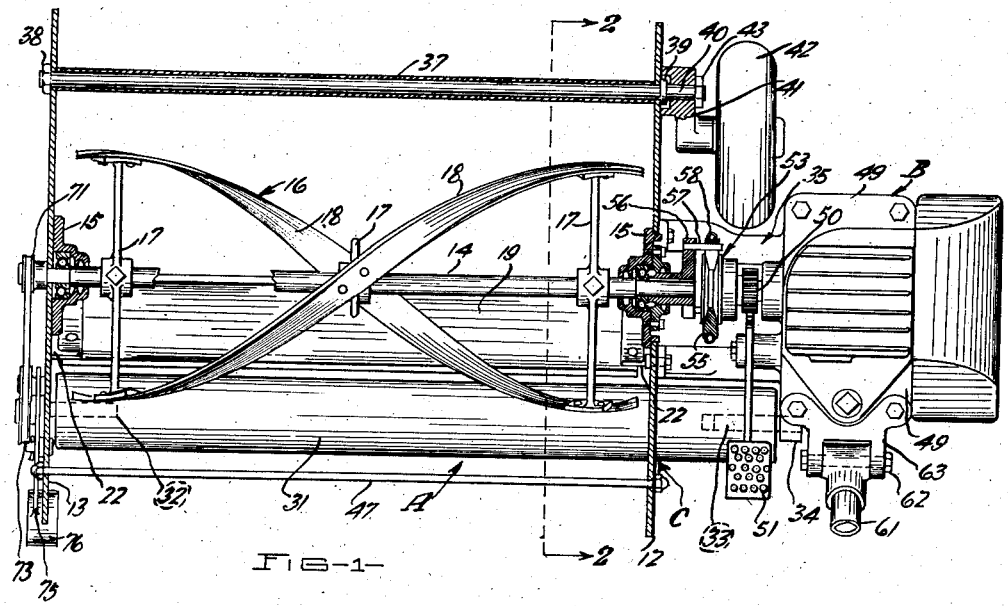
FIG-1-
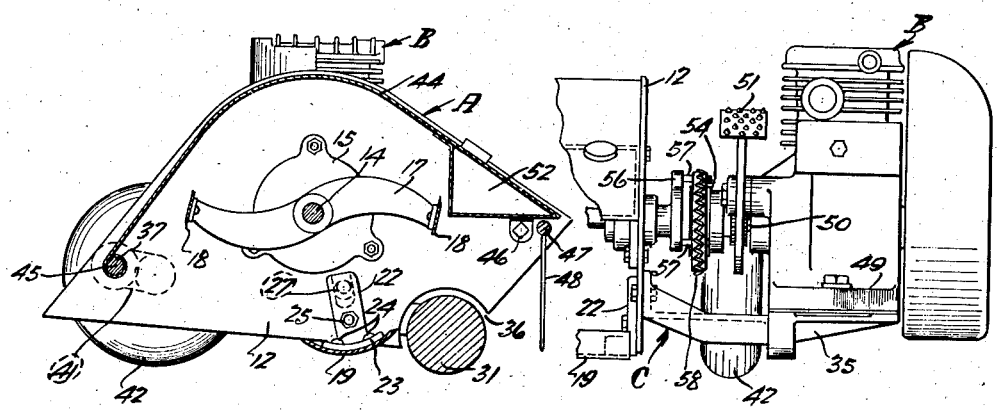
FIG-2-  FIG-3-
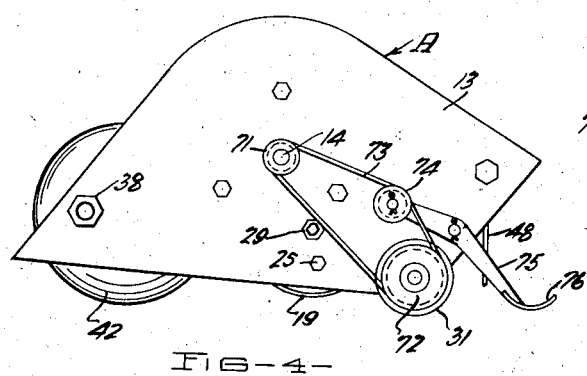
FIG-4-
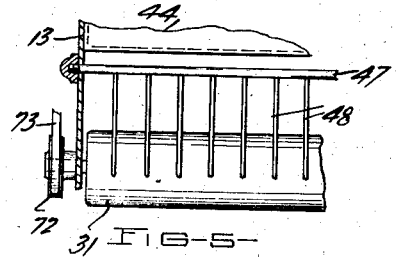
FIG-5-
INVENTOR
ADOLPH RONNING
BY
ATTORNEY April 15, 1941.  A. RONNING  2,238,707
LAWN MOWER
Filed July 27, 1938  2 Sheets-Sheet 2
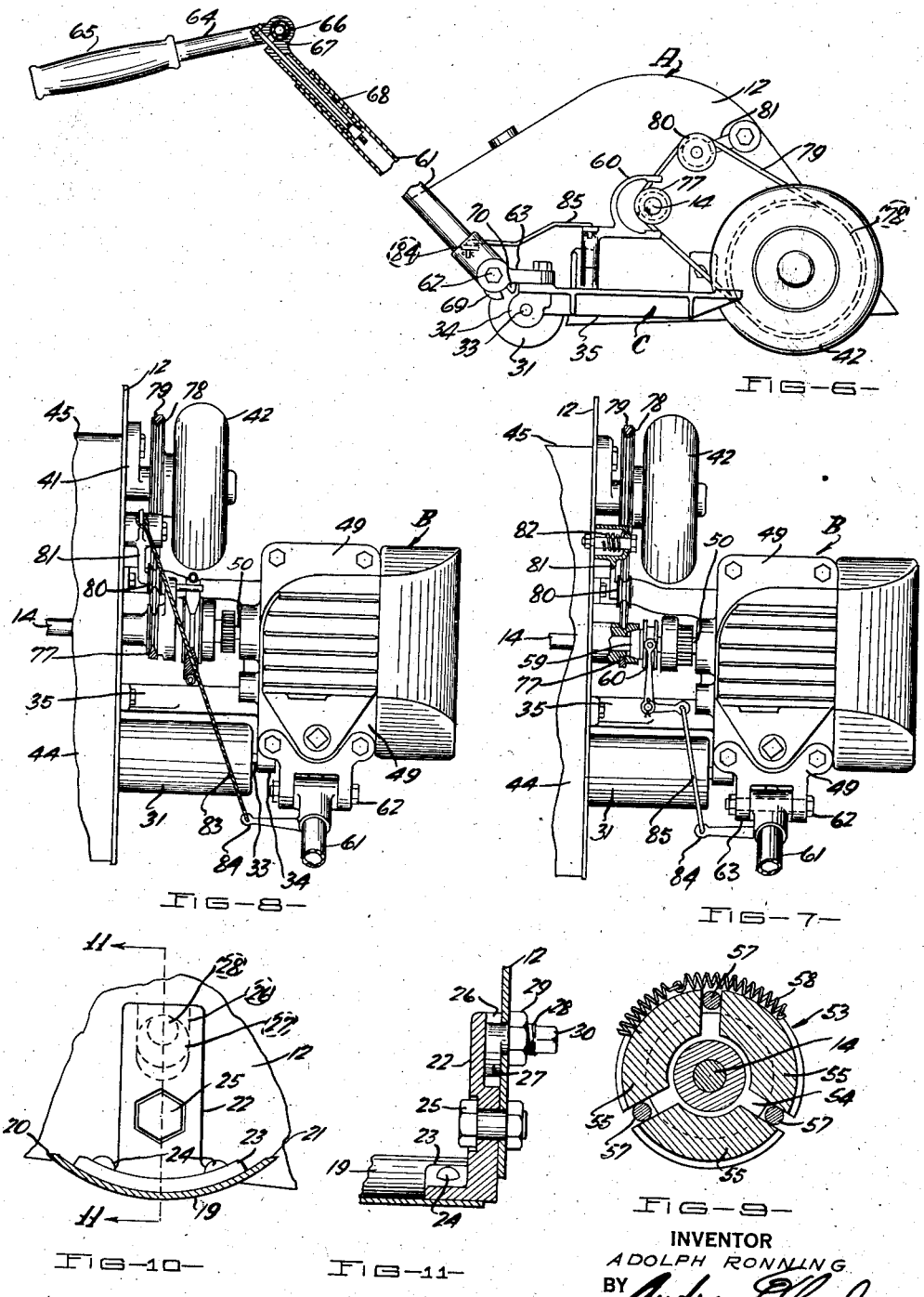
INVENTOR
ADOLPH RONNING
BY
ATTORNEY Patented Apr. 15, 1941

2,238,707

UNITED STATES PATENT OFFICE 2,238,707

LAWN MOWER

Adolph Ronning, Minneapolis, Minn.

Application July 27, 1938, Serial No. 221,538

6 Claims. (Cl. 56—26)

This invention relates to improvements in lawn mowers, and the primary object of the invention is to provide a power operated mower suitable for use in mowing the ordinary residential lawns, and which is of such shape and of sufficient lightness and compactness that it may be readily manipulated around and about shrubbery, walks, and other such items generally found on the lawn.

Another object is to provide a mower of the power driven variety in which a small, self-contained power unit is employed for driving the mower reel and, if desired, propelling the mower over the ground, but in which the parts are so proportioned and constructed that even without power traction the mower is readily pushed over the lawn.

A further object is to provide a mower involving improvements in the frame assembly and suspension means by virtue of which the weight is so distributed that the entire mechanism may be supported upon a single ground wheel, thus facilitating the travel of the machine over the ground, the use of the machine adjacent shrubbery and walks and, by convenient adjustment of only the ground wheel, making it possible to readily adjust the height of the cut.

Another object is to provide a mower having an improved reel and ledger bar assembly wherein a two blade reel is employed and operated at high speed in order to clip the grass in fine particles which may be deposited on the cut lawn without injury thereto, and in which the ledger bar is of a self-supporting type, having both edges sharpened so that when one edge is dulled the other may be employed by simply reversing the bar in the frame. In connection with the ledger bar the invention further contemplates improvements in the mounting therefor in order to facilitate the proper adjustment of the bar with relation to the reel.

Another object is to provide a mower in which all working parts are enclosed within a sheet metal casing designed to prevent injury, especially to children, from contact with the parts while in operation, and wherein the casing employed primarily for safety purposes also is of such shape and design that it may facilitate the work of the machine around shrubbery by presenting a "streamlined" body adapted to lift up and work beneath the branches without injury thereto.

A further object is to provide, for a mower of this kind, an improved handle assembly having adjustable handle bars similar to those employed on bicycles and with the handle arranged and connected to provide for convenient control of the power drive for the reel and mower.

Still a further object is to provide a mower of these desirable characteristics which, while necessarily somewhat more complicated than the usual mower, is withal relatively simple, inexpensive, compact, and of light weight, and so designed that the parts may be readily disconnected and taken down for inspection or repair.

These and other more detailed and specific objects will be disclosed in the course of the following specification, reference being had to the accompanying drawings, in which—

Fig. 1 is a horizontal section of the mower taken through the axis of the reel, with the casing or housing removed, and the power unit and other parts shown in plan view.

Fig. 2 is a vertical cross section along the line 2—2 in Fig. 1, showing the casing or housing in place.

Fig. 3 is a rear elevation of one end of the mower, showing the power unit and associated parts.

Fig. 4 is an end elevation of the mower.

Fig. 5 is a fragmental rear elevation, showing one side of the casing in vertical section.

Fig. 6 is an end view of the mower, showing the handle in place, but with the power unit removed to disclose driven parts.

Fig. 7 is a fragmental plan view of the driving end of the mower and illustrating one form of drive assembly and arrangement.

Fig. 8 is a view similar to Fig. 7 but showing another type of drive.

Fig. 9 is an enlarged diametrical section through the flexible drive coupling.

Fig. 10 is a fragmentary enlarged cross section through the ledger bar and associated parts.

Fig. 11 is a vertical section along the line 11—11 in Fig. 10.

Referring now more particularly and by reference characters to the drawings, A designates the mower assembly per se and B the power unit and drive asssembly, both of which mechanisms are supported from a common wheel and roller borne frame designated generally at C.

The mower assembly A will be first described in detail, and the same comprises a housing including the spaced end plates 12 and 13 through the medial portions of which is mounted a reel shaft 14 journaled in self-aligning ball bearings 15 attached to said end plates. This shaft 14 carries the reel 16 made up of the spiders 17 secured in spaced relation to the shaft for supporting the spiral reel blades 18. It will be noted that the blades 18 are disposed edgewise with respect to the orbital path through which they travel, and this arrangement provides for a minimum amount of fanning or displacement of the air by the rapidly rotating reel such as would interfere with the proper operation of the mower.

The end plates 12 and 13 are further connected by a ledger bar 19 which, in accordance with my invention, is pressed from sheet metal to an arcuate cross sectional contour to add rigidity and provide two parallel, sharpened edges 20 and 21. Thus, as either edge is dulled by use, the other may be put into use by simply reversing the ledger bar end for end in the mower frame. The bar is provided at its ends with L-shaped hangers 22 which have their inwardly turned ends 23 riveted at 24 to the ends of the ledger bar and have their upwardly turned legs mounted by bolts 25 within the said end plates 12 and 13. Upwardly of these bolts 25 the hangers 22 are provided with recesses 26 opening against the mower end plates, and cams 27 are mounted in these recesses in such manner that by rotating the cams the angular position of the ledger bar may be readily adjusted. The said cams are formed at the inner ends of threaded studs 28 which are mounted through the mower end plates and provided outwardly thereof with lock nuts 29 by which the cams may be locked in any adjusted position. For convenience in making these adjustments the outer ends of the studs 28 are reduced and faced off as at 30 so that, by placing a wrench on these ends and another on the nuts 29, the cams may be readily adjusted to any position and held thereat while the lock nuts are turned up tight. It is, of course, necessary as herein shown that the ledger bar be mounted below the reel 16 and in such position that one of the cutting edges 20 and 21 will be movable into operative position with respect to the path of the reel blades 18 so that the grass against which the ledger bar moves will be clipped off by operation of the reel.

Rearwardly of this ledger bar assembly I provide a ground roller 31 of elongated form which is journaled at one end on a short pin 32 extended inwardly from the end plate 13. This is the left hand end of the machine, in use, and the roller terminates within the end plate thereat, as shown. However, at the right hand end of the machine, whereat the power unit B is mounted, as will hereinafter be described, the roller is extended outwardly beyond the end plate 12 and at some distance beyond that plate is journaled on a pin 33 which is extended inwardly from a rearward projection 34 of the frame casting 35 for supporting said power unit. The end plate 12 is, of course, appropriately cut away, as at 36, to clear this end of the roller.

Forwardly of the reel 16 the end plates 12 and 13 are further joined by a transversely extended rod 37 which passes through openings in the end plates near the forward extremities thereof. At the left hand end of the rod 37 is carried a threaded nut 38, and at the other end a shoulder 39 bears against the end plate 12 so that by drawing the nut tight the end plates may be rigidly joined and the rod will be held against rotation. The extended end 40 of the rod (outwardly of the shoulder 39) forms a convenient mounting for the crank member 41 of a ground wheel 42, which member supports the ground wheel eccentrically with respect to the axis of the rod 37 and allows the adjustment of the wheel to any desired height. A nut 43 threaded on the rod end 40 serves to lock the crank member in any adjusted position without interference with the aforesaid locking and mounting of the rod 37 itself, and it is thus possible, by a single adjustment, to vary the height at which the ground wheel 42 carries the frontal end of the mower, and consequently to vary the height at which the grass is cut by action of the reel.

The foregoing completes the essential operating parts of the mower assembly itself. Attention may be directed, however, to the shape of the end plates 12 and 13 by which they slope sharply downward at both front and rear ends from the medial high point necessary for operation of the reel. A cover plate 44 is provided to enclose the reel and other parts, and this plate is shaped to fit nicely between the upper edges of the end plates so that the entire casing device has a sharply, forwardly sloped edge adapted to work nicely under shrubbery or the like and to lift the branches up and over the mower without injury. The almost total enclosure of the reel and working parts by this casing assembly further guards against injury by contact with the parts while operating. The frontal end of the cover plate 44 is rolled, at 45, over the rod 37 and at its rear end is releasably secured by bolted brackets 46 to the end plates. Below this rear end of the cover plate a rod 47 is pivotally mounted between the end plates and carries a series of rods 48 which hang vertically behind the roller. This comb-like device thus further aids in the prevention of children, or others, from getting their hands in working parts but still, as necessary, leaves the rear of the casing open sufficiently for the discharge of grass clippings therethrough. The entire assembly may obviously be readily taken apart for inspection or repair.

The power unit B may be any suitable light, self contained device such as a small internal combustion engine, and the same is mounted by its base 49 on the outer end portion of the casting 35 so as to bring its drive shaft or power take off shaft 50 into alignment with the extended end of the reel shaft 14. The starting pedal 51 for the power unit may then be extended rearwardly over the roller 31 in a position convenient for operation by a person walking behind the mower. The fuel tank for the power unit is formed as a part of the rear edge of the cover plate 44, as shown at 52, thus lending added rigidity to the mower casing assembly, and supporting the weight of the fuel evenly over the roller 31.

The drive connection to the reel may be made by a flexible, overload release coupling 53 which comprises a grooved pulley 54 secured to the drive shaft 50 of the power unit and having resilient blocks 55 mounted in its groove. The reel shaft 14 carries a drive plate 56 at its end which has extended pins 57 placed between the blocks 55, outwardly of the pulley 54, and in such manner that a flexible driving connection will be formed between the shafts. The blocks 55 are urged inwardly into frictional driving engagement with the pulley groove by a retractile coil spring 58 which is stretched around the outer peripheral margins of the blocks. This coupling therefore is capable of release due to overload or stoppage of the reel for any reason, and injury to the working parts is thus prevented. However, this assembly provides for continuous operation of the reel so long as the power unit B functions, and this may, or may not, be desirable. Therefore, I may provide, as shown in Fig. 7, a releasable clutch drive 59 having the usual fork 60 for release, and the operation of this clutch will be hereinafter more fully described.

For manipulating the mower, I provide a tubular handle 61 which is pivotally mounted at its lower end on a transversely axised bolt 62 in a bracket 63 secured to the base casting 35 immediately behind the power unit B, and from which mounting the handle is extended upwardly and rearwardly, as shown. A handle bar assembly, similar to that of a bicycle, is provided at the rear end of the handle 61 and comprises the handle bars 64 having the hand grips 65 and having their junction 66 adjustable in a clamp 67 which in turn is adjustable toward or away from the handle 61 by the telescoping and expansible member 68 mounted therein. This handle assembly provides for adjustments in height, length, and angular position to meet any requirements. A lug 69 is provided for contact with a stop 70 to limit the movement of the handle upon the bolt 62 and prevent the handle from falling to the ground.

In operation the mower may be pushed over the lawn with the power unit B operating, and the reel 16 will thus function to clip the grass. The reel is designed to operate at high speed in such manner that the grass will be clipped off in very small particles, which may then be discharged through the rear of the mower onto the clipped lawn without injury thereto. In fact it has been found that finely comminuted grass particles, such as are the output of my mower, have a beneficial effect on the grass which, of course, is not the case in the use of the ordinary mower which cuts relatively long lengths of the grass blades and which have a tendency to mat upon the clipped grass with a resulting injury thereto.

Attention is directed to the particular, novel supporting arrangement for my mower which provides that the left hand end or working end of the mower is solely supported by the roller 31. This greatly facilitates the use of the mower adjacent shrubbery, walks, and the like, and there will be no tendency of the mower to either leave the grass unclipped or to "dig in" as is the case with the present mower having ground wheels at each end. However, due to the weight of the power unit B being disposed toward the opposite right hand end or driving end of the mower, lateral stability is excellent, and the weight is very evenly distributed between the roller and the single ground wheel 42. The center of gravity is so disposed by the supporting and frame arrangement, and by the location of the power unit B substantially between the roller and ground wheel, that the machine is conveniently manipulated by the handle 61 extended rearwardly from behind the power unit, and this location of the handle at the driving end of the mower further facilitates the mowing around shrubbery. The mower actually serves both as a mower and as an edge trimmer, and accomplishes the work of both with equal facility.

While the machine, as herein described, will be found to be of sufficient lightness to make it very convenient to push around over the lawn, it may be desirable to provide for power traction drive under some circumstances. This may be accomplished in a number of ways and several are shown herein.

In Figs. 1 and 4, the reel shaft 14 is provided at its left hand end, outwardly of the end plate 13, with a drive pulley 71, and the pin 32 for the roller 31 is rigidly connected with the roller, journaled outwardly through the end plate, and provided with a driven pulley 72. A belt 73 is trained over these pulleys 71 and 72 for driving the roller from the power unit B and propelling the mower over the lawn. Control of the drive may be had by use of an idler pulley 74 which engages the belt 73 and normally holds the same taut but which is so mounted on its crank lever 75 that, by tipping the mower back slightly, the heel 76 of the crank will contact the ground and swing the idler pulley free of the belt to thereby disconnect the drive. This entire assembly may, of course, be arranged within the end plate 13, or the other end of the roller might be driven, as may be desired.

In Figs. 6, 7, and 8, the drive is shown as applied to the ground wheel 42 by providing the right hand end of the reel shaft 14 with a pulley 77, aligned with a pulley 78 on the wheel, for the reception of the drive belt 79. The idler pulley 80 in this case is supported by a crank arm 81 on the end plate 12 and which arm is spring set by a torsional coil spring 82 to hold the belt taut during adjustments of the ground wheel 42 as hereinbefore pointed out. In Fig. 8, the crank arm 81 is connected by a cable 83 to a finger 84 secured to the handle 61 in such manner that when this handle is picked up or raised slightly to steer the mower, the belt drive will function but, when the handle is dropped against the stop 70, the resulting pull on the cable 83 will swing the idler clear and disconnect the traction drive. In Figs. 6 and 7 the fork 60 for the releasable clutch 59 is similarly connected by a link 85 to the finger 84 so that both the reel and the traction drive will be disconnected when the handle 61 is dropped.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a lawn mower, a frame, a ground roller supporting the frame at the rear thereof, a ground wheel supporting the frontal portion of the frame and disposed in the path of one end of the roller, a power unit mounted on the frame behind and outwardly of the ground wheel, a grass cutting device in the frame and connected to the power unit for operation thereby, and a traction connection between the power unit and the roller, for propelling the mower over the lawn.

2. In a lawn mower, a frame, a ground roller partially supporting the frame, a power unit carried by the frame, a rotating reel assembly in the frame and having connection to the power unit for operation thereby, a pulley on the reel, a pulley connected to the roller, a belt trained over the pulleys, an idler pulley for tightening the said belt and establishing a driving connection between the power unit and roller, and ground engaging means responsive to a tipping movement of the frame for adjusting the idler pulley and loosening the belt to thereby render the driving connection ineffective.

3. In a lawn mower, a frame, a ground roller, a power unit carried by the frame, a rotating cutter assembly in the frame and having connection to the power unit for operation thereby, a pulley on the cutter, a pulley connected to the roller, a belt trained over the pulleys, an idler pulley for tightening the said belt and establishing a driving connection between the power unit and roller, and a vertically adjustable member supporting the said idler pulley and responsive to a tipping movement of the frame for adjusting the idler pulley and loosening the belt to thereby render the driving connection ineffective.

4. In a lawn mower, a frame, a ledger bar extending transversely in the frame and supported at its ends therein, a rotary cutter journalled at its ends in the frame over the ledger bar, a power unit support at one end of the frame, a power unit mounted on the support and connected to the said cutter for rotating the same, a roller supported transversely in the frame to the rear of the ledger bar and cutter, said roller having one end journalled in one end of the frame and its other end extended through the other end of the frame and journalled in the power unit support, and a ground wheel connected to the frame adjacent the end at which said power unit is carried and disposed forwardly of the extended end of the roller and inwardly of the said power unit.

5. A lawn mower comprising a frame including spaced end members, a rotary cutter and ledger bar assembly supported between the end members, a rearwardly and transversely disposed roller journalled at one end in an end member and extending at its other end through and beyond the other end member, a ground wheel forwardly disposed with respect to said extended end of the roller, a support carried by the end member of the frame adjacent the extended end of the roller, and a power unit mounted on the support and operatively connected to the cutter and supported in a position where its weight will tend to hold down the part of the frame adjacent the extended roller end.

6. A lawn mower comprising a frame, having end members, a rotary cutter and ledger bar assembly supported on the end members of the frame, an elongated rearwardly and transversely disposed roller, journalled at one end in an end member of the frame and extending at its other end through and laterally from the frame, a power unit support on the end member of the frame adjacent the extended end of the roller and in which said extended end is journalled, a ground wheel spaced forwardly from the extended end of the roller, and a power unit mounted on the support and operatively connected to the cutter, the said power unit being located outwardly of the said ground wheel and the extended end of the roller and in a position between the extended axes of said wheel and roller in a transverse vertical plane between the axes of the roller and wheel.

ADOLPH RONNING.